United States Patent
Lee et al.

(10) Patent No.: US 12,455,880 B2
(45) Date of Patent: Oct. 28, 2025

(54) INTELLIGENT OPTIMIZATION OF PARAMETERIZED QUERIES

(71) Applicant: SAP SE, Walldorf (DE)

(72) Inventors: Taehyung Lee, Seoul (KR); Taeyoung Jeong, Seoul (KR); Taehun Kim, Seoul (KR); Sungwon Kim, Seoul (KR); Sanghee Lee, Seoul (KR)

(73) Assignee: SAP SE, Walldorf (DE)

( * ) Notice: Subject to any disclaimer, the term of this patent is extended or adjusted under 35 U.S.C. 154(b) by 9 days.

(21) Appl. No.: 18/075,781

(22) Filed: Dec. 6, 2022

(65) Prior Publication Data
US 2024/0086404 A1    Mar. 14, 2024

Related U.S. Application Data

(60) Provisional application No. 63/405,711, filed on Sep. 12, 2022.

(51) Int. Cl.
*G06F 16/2453*    (2019.01)

(52) U.S. Cl.
CPC .... *G06F 16/2454* (2019.01); *G06F 16/24542* (2019.01)

(58) Field of Classification Search
CPC .............. G06F 16/2454; G06F 16/24542
USPC ............................................. 707/718
See application file for complete search history.

(56) References Cited

U.S. PATENT DOCUMENTS

| | | | |
|---|---|---|---|
| 7,933,894 B2 * | 4/2011 | Friedman | G06F 16/24542 707/718 |
| 8,224,806 B2 * | 7/2012 | Al-Omari | G06F 16/24524 707/718 |
| 9,886,477 B2 | 2/2018 | Jahankhani | |
| 2011/0029508 A1 * | 2/2011 | Al-Omari | G06F 16/24524 707/718 |
| 2013/0198232 A1 * | 8/2013 | Shamgunov | G06F 16/2471 707/770 |
| 2021/0303571 A1 * | 9/2021 | Chang | G06F 16/24542 |
| 2021/0357407 A1 * | 11/2021 | Bok | G06F 16/24542 |

OTHER PUBLICATIONS

Ioannidis, Yannis E., et al., "Parametric Query Optimization", The VLDB Journal, vol. 6, May 1997, pp. 132-151.*

(Continued)

*Primary Examiner* — Robert Stevens
(74) *Attorney, Agent, or Firm* — Klarquist Sparkman, LLP

(57) ABSTRACT

A computer implemented method can receive a parameterized query written in a declarative language. The parameterized query comprises a parameter which can be assigned different values. The method can perform a first compilation session of the parameterized query in which the parameter has no assigned value. Performing the first compilation session can generate an intermediate representation of the parameterized query. The intermediate representation describes a relational algebra expression to implement the parameterized query. The method can perform a second compilation session of the parameterized query in which parameter has an assigned value. Performing the second compilation session reuses the intermediate representation of the parameterized query.

18 Claims, 8 Drawing Sheets

(56) References Cited

OTHER PUBLICATIONS

Chaudhuri, Surajit, et al., "Variance Aware Optimization of Parameterized Queries", SIGMOD '10, Indianapolis, IN, Jun. 6-10, 2010, pp. 531-542. Chaudhuri, Surajit, et al., "Variance Aware Optimization of Parameterized Queries", SIGMOD '10, Indianapolis, IN, Jun. 6-10, 2010, pp. 531-542.*
"SAP HANA Performance Guide for Developers", SAP HANA Platform 2.0 SPS 04, Document Version: 1.1, Oct. 31, 2019, pp. 1-4, 28-34, 117, 134-136, 153, 161, 171 and 242.*
"Compiler", Wikipedia, downloaded from: https://en.wikipedia.org/wiki/Compiler on Apr. 9, 2025, pp. 1-18.*
Ghazal, Ahmad, et al., "Dynamic Plan Generation for Parameterized Queries", SIGMOD '09, Providence, RI, Jun. 29-Jul. 2, 2009, pp. 909-915.*
Microsoft Dictionary, 5th Edition, Microsoft Press, Microsoft Corp., Redmond, WA, © 2002, pp. 185 and 529.*
"Abstract syntax tree," Wikipedia, https://en.wikipedia.org/wiki/Abstract_syntax_tree, printed Oct. 5, 2022, 5 pages.
Randolf Eilenberger, "Safeguard Performance of ABAP CDS Views—Part 2 HANA SQL Optimizer and Plan Cache," Safeguard Performance of ABAP CDS Views—Part 2 HANA SQL Optimizer and Plan Cache I SAP Blogs, printed Sep. 21, 2022, 15 pages.
GE Digital, "Parameterized SQL Queries," Historian 7.2 Documentation, ttps://www.ge.com/digital/documentation/historian/version72/c_parameterized_sql_queries.html, printed Aug. 29, 2022, 1 page.
Microsoft Tech Community, "How and Why to Use Parameterized Queries," https://techcommunity.microsoft.com/t5/sql-server-blog/how-and-why-to-use-parameterized-queries/ba-p/383483, printed Aug. 29, 2022, 5 pages.
SAP, "SAP HANA Performance Guide for Developers, SAP HANA SQL Optimizer" https://help.sap.com/docs/SAP_HANA_PLATFORM/9de0171a6027400bb3b9bee385222eff?locale=en-US&state=PRODUCTION&version=2.0.04, printed Oct. 5, 2022, 16 pages.
SAP, "SAP HANA Troubleshooting and Performance Analysis Guide, SQL Plan Stability," https://help.sap.com/docs/SAP_HANA_PLATFORM/bed8c14f9f024763b0777aa72b5436f6?locale=en-US&state=PRODUCTION&version=2.0.04, printed Oct. 5, 2022, 5 pages.
SAP, "Performance and Tuning Series: Query Processing and Abstract Plans," SAP Adaptive Server Enterprise 16.0 SP04, Aug. 12, 2021, 366 pages.
SAP, "Performance and Tuning Series: Query Processing and Abstract Plans, Abstract Query Plan Guide," https://help.sap.com/docs/SAP_ASE/a7b3e46335184f5caf70a08c91c540f3?locale=en-US&state=PRODUCTION&version=16.0.3.6, printed Oct. 5, 2022, 31 pages.
"SAP Note 2410208—Collect Explain Plan of a Prepared Statement," https://www.forosap.com/forum/foros-de-sap/notas-sap/38333-sap-note-2410208-collect-explain-plan-of-a-prepared-statement, printed Sep. 21, 2022, 2 pages.
SQLshack, "SQL Server Database Parameterization option and its Query Performance effects," SQL Server Database Parameterization option and its Query Performance effects (sqlshack.com), printed Aug. 29, 2022, 12 pages.
Tae Suk Son, "Protect from performance regression with SQL Plan Stability," SAP Blogs, https://blogs.sap.com/2018/07/03/protect-from-performance-regression-with-sql-plan-stability/, printed Aug. 29, 2022, 5 pages.

* cited by examiner

```
{
  "version":1,
  "abstract_plan":{
    "operators":[
      {
        "id":1,
        "name":"DATA ACCESS",
        "sources":[
          1
        ],
        "columns":[
          4
        ],
        "filter":3,
        "alias":"TEST1"
      },
      {
        "id":2,
        "name":"PROJECT",
        "sources":[
          1
        ],
        "columns":[
          5
        ],
        "labels":[
          "ID"
        ]
      }
    ],
    "root":2,
    "max_expression_id":5,
    "expressions":[
      {
        "id":3,
        "expr":"([0][1]) = (cast($1 as __nstring__(5000)))"
      },
      {
        "id":4,
        "expr":"[0][0]"
      },
      {
        "id":5,
        "expr":"[0][0]"
      }
    ]
  },
  "data_sources":[
    {
      "id":1,
      "database":"SW0",
      "schema":"SYSTEM",
      "name":"TEST1",
      "type":"COLUMN TABLE",
      ...
```

```
      ...
      "columns":[
        {
          "name":"ID",
          "type":"__int_notnull__",
          "nullable":false,
          "encrypted":false
        },
        {
          "name":"NAME",
          "type":"__nvarchar3__(10)",
          "nullable":true,
          "encrypted":false
        }
      ],
      "internal_columns":[
        {
          "name":"$trex_udiv$",
          "type":"__integer__",
          "nullable":true,
          "encrypted":false
        },
        {
          "name":"$rowid$",
          "type":"__bigint__",
          "nullable":true,
          "encrypted":false
        }
      ],
      "indexes":[
        {
          "name":"_SYS_TREE_CS_#226357_#0_#P0",
          "columns":[
            "ID"
          ],
          "type":"BTREE",
          "unique":true
        }
      ]
    }
  ],
  "annotations":[
    {
      "MAX_LOGICAL_REL_ID":"1000000"
    },
    {
      "id":1,
      "LOGICAL_REL_ID":"1000000"
    },
    {
      "required":[
      ]
    }
  ]
}
```

FIG. 6

INTELLIGENT OPTIMIZATION OF PARAMETERIZED QUERIES

CROSS-REFERENCE TO RELATED APPLICATIONS

The present application claims the benefit of U.S. Provisional Application No. 63/405,711, filed Sep. 12, 2022, which is incorporated by reference herein.

BACKGROUND

A query plan (also referred to as "query execution plan") is a sequence of steps that a database management system (DBMS) executes in order to complete a query. When a query is run for the first time in the DBMS, the query can be compiled by a query optimizer to generate a corresponding query plan, which can be stored in memory called query plan cache, or simply plan cache. Thus, when the same query is run again, the DBMS does not need to regenerate the query plan. Instead, it can reuse the cached query plan stored in the query plan cache, thereby improving efficiency of the DBMS.

Query optimization refers to the overall process of attempting to choose a most efficient query plan, among many candidate query plans, to execute a query. Optimizing a parameterized query (also known as "prepared statement") can be challenging as the value for a query parameter may not be provided until the query execution time. Thus, there is room for improving optimization of parameterized queries.

BRIEF DESCRIPTION OF THE DRAWINGS

FIG. 6 depicts an example abstract query plan generated from the intermediate representation of the parameterized query of FIG. 5.

DETAILED DESCRIPTION

Example 1—Overview of Parameterized Query Optimization

A parameterized query is a type of structured query language (SQL) query which allows placing a parameter in a query statement serving as a placeholder. The parameter can take its value (e.g., in a separate statement) when the parameterized query is executed, which allows the parameterized query to be reused with different values and for different purposes. There are several benefits of using parameterized queries. Generally, parameterized queries are more readable than non-parameterized queries. Parameterized queries can be prepared in advance and then reused for similar applications without having to create distinct SQL queries for each case. Importantly, parameterized queries can be used for security reasons. For example, parameterized queries can be used to mitigate or avoid so-called SQL injection attacks which can result in unauthorized access to sensitive data.

However, challenges exist for optimizing parameterized queries. For cost-based query optimization schemes, a query optimizer can rank the candidate query plans from the lowest cost to the highest cost (e.g., in terms of usage of system resources, such as I/O, CPU, memory, etc.), and select the query plan with the lowest cost for execution. The cost-based query optimization often collects and/or estimates statistics (e.g., cardinality, distinct value count, value distribution, etc.) on tables and indexes involved in a query and uses those statistics to estimate costs of query plans. When the parameter in a parameterized query is unspecified (i.e., the parameter has no assigned value or argument), the estimated statistics can have large errors (e.g., the query optimizer may not know selectivity of filter predicates with parameters). As a result, the query plan generated by the query optimizer may not be optimal after all or even close to be optimal.

The technology described herein provides a system and method for intelligent optimization of parameterized queries. Such system and method generate optimal execution plans for parameterized queries in an efficient manner, thus improving overall query plan optimization schemes in DBMS.

Figure 1:
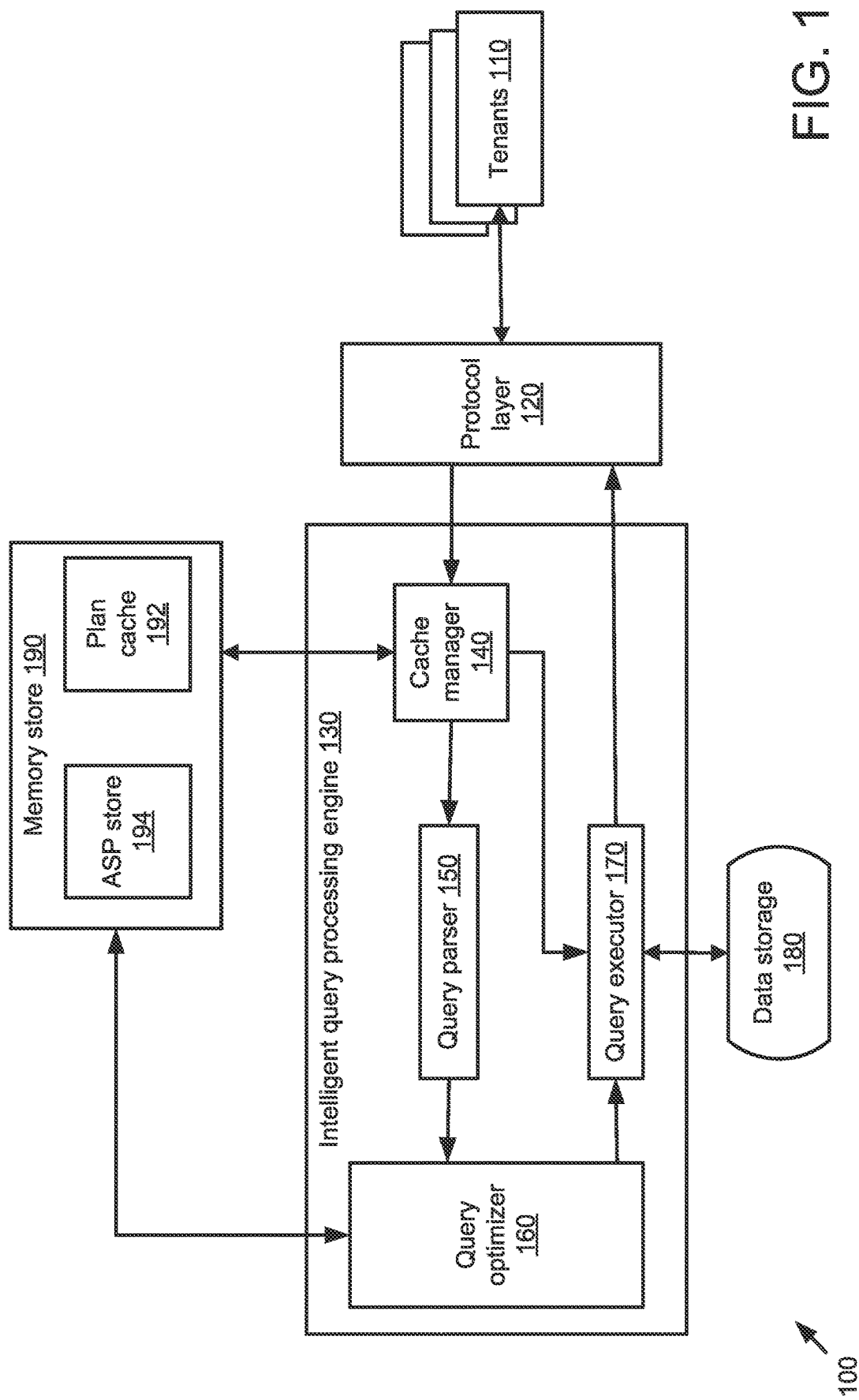
FIG. 1 is an overall block diagram of an example database management system supporting intelligent optimization of parameterized queries.

Example 2—Example Database System Supporting Intelligent Optimization of Parameterized Queries FIG. 1 shows an overall block diagram of an example database management system 100 which supports intelligent optimization of parameterized queries.

The database management system 100 can be configured to support multi-tenancy. As shown, the database management system 100 includes an intelligent query processing engine 130 and a protocol layer 120 which serves as an interface between one or more tenants 110 and the intelligent query processing engine 130. For example, the protocol layer 120 can implement a server name indication protocol by which the tenants 110 can connect to the intelligent query processing engine 130. Each tenant 110 represents a group of users who can access a tenant-specific database managed by the database management system 100.

The intelligent query processing engine 130 can include a cache manager 140, a query parser 150, a query optimizer 160, and a query executor 170. The cache manager 140 can access a plan cache 192 in a memory store 190. The plan cache 192 represents a fast-access memory space configured to store previously compiled query plans.

An incoming SQL query (or simply "query") sent from a tenant 110 can be evaluated by the cache manager 140 to determine if the query has a corresponding (compiled) query execution plan stored in the plan cache 192. As described herein, the incoming SQL query can be a parameterized query comprising at least one parameter which can be assigned different values or arguments.

If the cache manager 140 finds no query execution plan in the plan cache 192 that corresponds to the income query, the incoming query can be analyzed by the query parser 150, which can check if the query contains syntactic and/or semantic errors. After verifying that the incoming query is a valid transactional SQL statement (e.g., SELECT, INSERT, UPDATE, DELETE, MERGE, etc.), the query parser 150 can generate a logical trees in which the query can be run.

The logical tree can be used by the query optimizer 160 to generate a corresponding query execution plan, which determines how the query will be executed. The query optimizer 160 is configured to select a query execution plan (among a plurality of query execution plans that are generated based on enumeration of the logical tree) that yields optimal performance Performance of a query execution plan can be described in terms of cost, which can be time (e.g., time required to execute the query execution plan) and/or burden on computing resources (e.g., processing power and/or memory expended to execute the query execution plan). Cost-based query optimization chooses the query execution plan with the lowest cost among all candidate query execution plans. In practice, although the terms "optimal" and "optimize" are used, the actual best query execution plan may not be selected, but the selected query execution plan is deemed better than others based on data available to the query optimizer 160. Additional details of the query optimizer 160, particularly with respect to its operations for optimizing parameterized queries, are described more fully below.

The determined optimal query execution plan can then be sent to the query executor 170 for execution. The query executor 170 can communicate with a data storage or memory space 180 and execute operators in the query execution plan determined by the query optimizer 170. Data retrieved from the data storage or memory space 180 can be returned to the tenant 110 via the protocol layer 120.

As described herein, query compilation refers to the process of converting an incoming query to the optimal query execution plan (e.g., checking syntactic and/or semantic errors, generating the logical tree, and determining optimal query execution plan), as described above. Depending on the complexity of the query (e.g., the number of joined tables, etc.) and the query optimization algorithm, query compilation time can be long (e.g., tens of seconds or more). Thus, to improve operational efficiency, the compiled query execution plan (i.e., the determined most optimal query execution plan) corresponding to the incoming query can be stored in the plan cache 192 so that it can be quickly retrieved and reused if the same query is submitted again in the future.

For example, if the cache manager 140 determines that the incoming query has a corresponding query execution plan in the plan cache 192, that query execution plan can be fetched directly from the plan cache 192 and forwarded to the query executor 170 for execution. Thus, in this scenario, operations by the query parser 150 and query optimizer 160 can be bypassed. In other words, the incoming query does not need to be recompiled because its previously compiled query execution plan is available in the plan cache 192.

As noted above, the plan cache 192 can store compiled query execution plans. For an incoming query, the cache manager 140 checks if it has a compiled query execution plan stored in the plan cache 192. If yes, then this cached query execution plan can be reused. This can improve efficiency because it eliminates the time of compiling the query (i.e., regenerating the query execution plan). On the other hand, if the query has no compiled query execution plan stored in the plan cache 192, the query has to be compiled. The compiled query can then be stored in the plan cache 192 so that when the same query occurs again in the future, fast access to its cached query execution plan is feasible.

If the incoming query is new (i.e., a first-time query that has not been submitted before), this new query has no corresponding query execution plan in the plan cache 192 and it must be compiled for the first time. On the other hand, if the incoming query is old (i.e., the same query has been submitted at least once before), whether or not there is a corresponding compiled query execution plan in the plan cache 192 can depend on the size of the plan cache 192 and a plan eviction policy adopted by the cache manager 140.

The plan cache 192 has a limited size. Thus, it may not be able to store all compiled query execution plans. When the plan cache 192 approaches its full capacity, certain query execution plans may have to be evicted (i.e., removed) from the plan cache 192 to make room for new ones according to a predefined plan eviction policy implemented by the cache manager 140. For example, the cache manager 140 can implement a random plan eviction policy which evicts query execution plans from the plan cache 192 in a random manner In another example, the cache manager 140 can implement the least recently used (LRU) plan eviction policy which removes the least recently used query execution plans first from the plan cache 192. In yet another example, the least frequently used (LFU) plan eviction policy can be used which first evicts the execution policies that are used least often. Many other plan eviction policies can also be used by the cache manager 140.

In certain circumstances, performance regression of query execution plans can occur, e.g., due to a system upgrade and/or data change of the database management system 100. To mitigate potential performance regression of query plans, the intelligent query plan optimizer 160 can be configured to capture selected query plans and reuse them if necessary to regenerate the original query plans so as to retain the original performance. The captured query plans can be stored in an abstract SQL plan (ASP) store 194. In the depicted example, the ASP store 194 resides in the memory store 190. In other examples, the ASP store 194 can be stored in a persistence layer, and loaded into the memory if needed. As described herein, the ASP can also be generally referred to as the "abstract query plan."

As described more fully below, the ASP store 194 can be used to store ASP objects which are generated by serializing intermediate representations of parameterized queries when running first compilation sessions of the parameterized queries. Such stored ASP objects can be deserialized and used for running second compilation sessions of the parameterized queries.

In practice, the systems shown herein, such as system 100, can vary in complexity, with additional functionality, more complex components, and the like. For example, there can be additional functionality within the intelligent query processing engine 130. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the query plans, the intermediate representations, the ASP objects, and the like can be stored in one or more computer-readable storage media or computer-readable storage devices. The technologies described herein can be generic to the specifics of operating systems or hardware and can be applied in any variety of environments to take advantage of the described features.

Example 3—Example Process for Optimizing Parameterized Queries in Two Compilation Sessions As described above, challenges exist for optimizing parameterized queries. If a query optimizer does not know the value assigned to a query parameter (also referred to as "parameter-blind:), the query optimizer cannot have an accurate estimate of statistics and operations involved in the query (e.g., filter selectivity, row counts, join order decisions, etc.). As a result, the generated query plan may be sub-optimal or less efficient than a query plan that would be generated by the query optimizer had the query parameter has an assigned value (also referred to as "parameter-aware").

One approach to improve the performance for those parameterized queries is to use two sequential compilation sessions. For example, HANA SQL query optimizer, which is provided by SAP SE of Walldorf, Germany, can perform a first compilation session of a parameterized query in which a parameter has no assigned value (i.e., the first compilation session is parameter-blind), and such first compilation session can generate an initial SQL execution plan. Then immediately after a user provides a value for the parameter, HANA SQL query optimizer can trigger a second compilation session of the parameterized query in which the parameter has the assigned value (i.e., the second compilation session is parameter-aware). This second compilation finds out the optimal SQL execution plan for the given parameterized query, and replaces the previous initial SQL execution plan.

Figure 2:
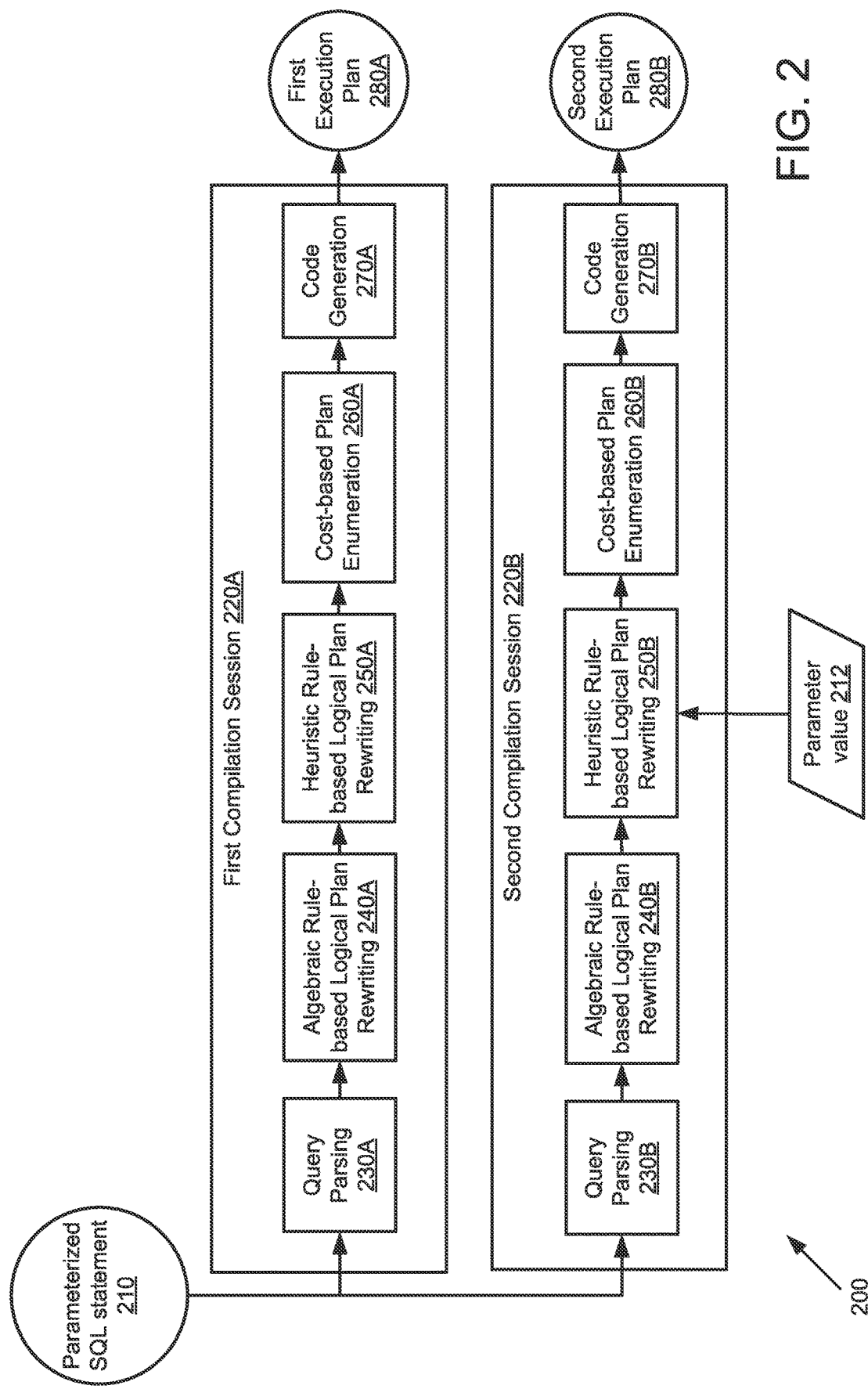
FIG. 2 is a flow diagram describing different phases of parameterized query optimization using two compilation sessions, according to one approach.

As an example, FIG. 2 depicts a flow diagram describing an overall process 200 for optimizing a parameterized query using two separate and sequential compilation sessions, and can be implemented, for example, by the intelligent query processing engine 130 depicted in FIG. 1.

After receiving a parameterized query 210 (e.g., expressed as a SQL statement) comprising at least one parameter which has no assigned value, a first compilation session 220A (which is parameter-blind) can be triggered. Generally, a query compilation session, such as 220A, can include a plurality of phases or stages that are performed in sequence. For example, the first compilation session 220A includes a query parsing phase 230A, an algebraic rule-based logical plan rewriting phase 240A, a heuristic rule-based logical plan rewriting phase 250A, a cost-based plan enumeration phase 260A, and a code generation phase 270A, all ordered in a sequence, as shown in FIG. 2. The output of the code generation phase 270A is a first execution plan 280A which represents the initial SQL execution plan, which is deemed to be an "optimal" plan in the absence of knowledge of parameter value for the parameterized query 210.

Then, after a user provides a parameter value 212 for the parameter, a second compilation session 220B (which is parameter-aware) can be triggered. Similar to 220A, the second compilation session 220B can include a plurality of phases or stages (e.g., a query parsing phase 230B, an algebraic rule-based logical plan rewriting phase 240B, a heuristic rule-based logical plan rewriting phase 250B, a cost-based plan enumeration phase 260B, and a code generation phase 270B) that are performed in sequence. The output of the code generation phase 270B is a second execution plan 280B which is far more detail in its optimal plan decision and is generally more "optimal" than the first execution plan 280A because the parameter value 212 can be used in the second compilation session 220B to estimate statistics and operations involved in the query 210, thus the query optimizer can more accurately evaluate and compare costs of different query plans. Thus, the second execution plan 280B can replace the initial SQL execution plan 280A for query execution.

As described herein, the query parsing phases 230A/230B can be performed by a query parser (e.g., 150) and the remaining phases (240A/240B, 250A/250B, 260A/260B, and 270A/270B) can be performed by a query optimizer (e.g., 160). The same computing units and/or computer programs can be used to perform operations in the matching phases of each query compilation session.

Example 4—Example Phases in a Query Compilation Session

Referring to FIG. 2, different phases in a query compilation session are described herein by using the first compilation session 220A as an example, although it is to be understood that the same operations are performed in matching phases of the second compilation session 220B.

In the query parsing phase 230A, the received parameterized query 210, which is expressed in in a declarative language (e.g., a SQL statement), can be parsed to generate an abstract syntax tree (AST), which can also be referred to as a "parse tree." As described herein, the declarative language specifies what a computer program should accomplish, without specifying how to accomplish it as a sequence of steps or actions. During the query parsing phase 230A, lexical analysis can be performed to scan and translate the query statement into a token stream. Then, syntax analysis can be performed to scan the token stream and check if the query is grammatically correct, e.g., matching predefined grammatic rules. The AST can be formed according to the grammatic rules at the end of successful syntax analysis. Additionally, semantic analysis can be performed to check if the AST is valid in terms of language semantics (e.g., checking validity of data types, operators, relational sources, privileges, etc.).

The AST defines a query tree structure comprising a plurality of nodes and edges linking the nodes. The AST can be deemed as an initial version of an internal or intermediate representation of the query 210. An intermediate representation of a query can also be referred to as a logical plan or a query tree object in some circumstances. As described below, the AST can be further transformed into other intermediate representations of the query 210 which have different query tree topologies (e.g., with different nodes and/or edges).

For each intermediate representation (e.g., AST) defining a corresponding query tree structure, the nodes can include leaf nodes and one or more internal nodes. A leaf node has no child nodes. In contrast, an internal node has one or more child nodes. The root of the query tree structure, or root node, can be regarded as a special internal node. Such query tree structure denotes a relational algebra expression. For example, tables involved in the query 210 can be represented as leaf nodes. The relational algebra operations can be represented as internal nodes. The root node can represent the query 210 as a whole. When a query plan is executed, an internal node can be executed when its operand tables are available. The internal node can then be replaced by a result table generated by the operation represented by the internal node. This process can continue for all internal nodes until the root node is executed and replaced by the result table, which can be returned as query results.

As described herein, each intermediate representation of a query describes a relational algebra expression to implement the query. Such relational algebra expression characterizes the logical and/or algebraic relationship among operands and operators embedded in the corresponding query tree structure. In other words, the intermediate representations of a query can instruct a computer program how to accomplish the query.

The algebraic rule-based logical plan rewriting phase 240A can convert the AST into a different version of intermediate representation through a cascaded transformation process. Specifically, the query optimizer can iteratively apply a series of relational algebraic transformation rules (e.g., predefined mathematically proven rules based on equivalences of relational algebra and logic) to rewrite a previous version of intermediate representation (starting from the AST) into a subsequent version of intermediate representation. Such transformation is deemed to be one directional because no reverse transformation is allowed, and each subsequent version of intermediate representation is presumably improved (e.g., simpler or having more optimization opportunity) compared to the previous version of intermediate representation.

The logical plan rewriting process can normalize and/or simplify the intermediate representations. For example, some of the rules can rewrite an intermediate representation by using materialized views (which contain already precomputed aggregates and joins) so as to improve operating efficiency. As a result, the rewriting process can reduce the number of operations (e.g., by merging query operations, removing redundant joins, etc.). Some example normalization steps include predicate normalization (e.g., expressing the logical operations in a conjunctive normal form and/or a disjunctive normal form, performing negation pushdown, etc.), operator normalization (e.g., swapping children to transform RIGHT OUTER JOIN to LEFT OUTER JOIN, decomposing set operators such as UNION, INTERSECT, EXCEPT/MINUS into respective chain of operators, etc.). Some other example simplification steps include constant expression folding, CASE expression simplification, rewriting complex predicate into simpler ones, removing redundant terms, common predicate term factoring, operator simplification (e.g., unnecessary JOIN elimination, intermediate Project elimination, unreferenced column elimination, etc.), among many others as known in the art.

The transformation performed in the algebraic rule-based logical plan rewriting phase 240A is one-to-one, i.e., after applying each relational algebraic transformation rule, only one intermediate representation of the query 210 is generated (from the previous version of the intermediate representation). The version of intermediate representation generated after completing the algebraic rule-based logical plan rewriting phase 240A can also be referred to as a "relational algebra tree" in some circumstances. As described further below, the version of intermediate representation generated after completing the algebraic rule-based logical plan rewriting phase 240A can be reused in the second compilation session 220B to improve the efficiency of parameterized query optimization.

Up to now, i.e., in both the query parsing phase 230A and the algebraic rule-based logical plan rewriting phase 240A, all involved compilation steps (e.g., query parsing, syntax and semantic analysis, rewriting using relational algebraic transformation rules, etc.) are parameter "blind," which means that these operations do not need to know what value is assigned to the parameter of the parameterized query 210 (because these two phases do not require data size estimation or comparison of execution cost). Thus, both phases 230A and 240A (and the compilation steps involved therein) are deemed to operate independently of the value assigned to the parameter of the parameterized query 210.

In the heuristic rule-based logical plan rewriting phase 250A, a series of heuristic rules can be sequentially applied to rewrite a previous version of intermediate representation into a subsequent version of intermediate representation. Instead of being derived from mathematical or algorithmic calculation, heuristic rules applied in this phase can be derived from numerous examinations and analyses. For example, one heuristic rule can cause switching the order of a higher-layer JOIN operator with a lower-layer JOIN operator if it is determined that a parent JOIN operator is expected to reduce the result of (i.e., more selective than) a child JOIN operator. Similar to the phase 240A, the transformations performed in the heuristic rule-based logical plan rewriting phase 250A is also one directional and one-to-one (i.e., no reverse transformation, and only a single version of intermediate representation is kept through the transformation process).

However, in contrast to the phase 240A, the heuristic rule-based logical plan rewriting phase 250A is not parameter "blind" because at least some operations in this phase depend on the value assigned to the parameter of the parameterized query 210. For example, some operators (e.g., JOIN, etc.) need to be reordered so that selective operators can be performed as early as possible (Heuristic JOIN/Aggregation Reorder), as described above. Such reordering is based on determination of some data statistics (e.g., table size estimation) which can be dependent on the parameter value 212. In another example, some heuristic rules need to collect data statistics and estimate cardinality for individual operators and/or selectivity of parameterized filter predicates in the intermediate representation. In yet another example, some heuristic rules can cause unfolding shared viewed if the estimated materialization cost of a shared relation is sufficiently expensive (i.e., heuristic view unfolding).

Thus, even if an identical version of intermediate representation is provided as an input to the heuristic rule-based logical plan rewriting phases 250A and 250B, the output versions of intermediate representation from the phases 250A and 250B can deviate significantly because the former has no knowledge of parameter value 212 whereas the latter uses the parameter value 212 in various heuristic rule-based rewriting steps.

In the cost-based plan enumeration phase 260A, the query optimizer is configured to enumerate alternative logical plans (which are intermediate representations annotated with execution algorithm and strategy) based on relational algebra and available execution algorithms. In some examples, two types of enumeration can be performed in this phase: logical plan enumeration and physical plan enumeration. The former can be used to build the overall shape of the query tree structure, and the latter can be used to determine the characteristics of each component in the query tree structure. Specifically, in logical plan enumeration, the query optimizer can enumerate all logically equivalent algebra trees (e.g., JOIN ordering, etc.) using equivalent rules. An equivalence rule ensures that expressions of two forms are the same or equivalent because both expressions produce the same output. These different relational algebra expressions (which have different query tree structures) generate the same output to the query. In physical plan enumeration, the query optimizer can enumerate all possible execution algorithms for operators embedded in the query tree structure (e.g., nested loop join, hash join, index join, etc., for a JOIN operator).

The query optimizer can estimate cost of individual alternative physical plan operators, based on cardinality estimation and cost formular for individual algorithms. As described above, the cost can be evaluated based on time (e.g., time required to execute the query execution plan) and/or burden on computing resources (e.g., processing power and/or memory expended to execute the query execution plan). As in phase 250A, the operations in the cost-based plan enumeration phase 260A depend on the value assigned to the parameter of the parameterized query 210. Notably, the transformation of intermediate representation is one-to-many, i.e., one version of intermediate representation generated by the phase 250A can be transformed into many different versions of intermediate representation in the phase 260A because of the cost-based plan enumerations.

Finally, in the code generation phase 270A, the query optimizer can select an intermediate representation whose corresponding logical plan is least expensive among all of those enumerated logical plans based on the calculated cost. The query optimizer can then generate an "optimal" execution plan (e.g., 280A) out of such selected intermediate representation.

Example 5—Example Overall Method of Implementing Intelligent Optimization of Parameterized Queries Although using two sequential compilation sessions as illustrated in FIG. 2 can produce more "optimal" query execution plans (e.g., the query plan 280B is generally more efficient than 280A when executed), the price to pay for the improved query execution plans is increased total compilation time. In other words, although the resulting query execution plan is more efficient to execute, the optimization process takes a longer time to generate such improved query execution plan because the process involves two separate compilation sessions 220A and 220B. Such dual compilation process can consume a lot of resources especially for large queries.

As described above, the two compilation sessions 220A and 220B have matching phases which involve similar operations. Thus, the two compilation sessions 220A and 220B can approximately double the amount of time compared to a single compilation session. Still, the first compilation session 220A cannot be skipped because it is required to collect query plan details, including result set type information, related objects, etc. For example, the first compilation session 220A (without assigned parameters) is usually required as response to Client's prepareStatement request. This request demands settlement of some certain properties collected during query compilation, such as result set metadata (e.g., specification of result relation, based on which a client can "decode" the ResultSet package), parameter metadata (e.g., specification of parameters, based on which the client can "encode" the parameter values accordingly), and some performance-related information (e.g., statement routing table—e.g., in a scale-out configuration—where the statement execution should be routed), etc.

Note, however, that both the query parsing phase (230A/230B) and algebraic rule-based logical plan rewriting phase (240A/240B) are independent of the parameter value 212. As such, operations involved in those matching phases (i.e., 230A/230B and 240A/240B) are duplicative. For example, the incoming query 210 is already parsed and checked for validity in the query parsing phase 230A, but the same and redundant operations will be performed in the query parsing phase 230B again. Moreover, because both the query parsing phase (230A/230B) and algebraic rule-based logical plan rewriting phase (240A/240B) are parameter "blind," the compilation steps in these phases are deterministic. In other words, given the same input, each step in these two phases will produce the same result (so long as the same parsing method is used for query parsing and the same algebraic rules/sequence are used for algebraic rule-based logical plan rewriting). Thus, given the same SQL query 210 as an input, the AST generated by 240A and 240B will have the same query tree structure (i.e., identical nodes and edges), and so are each version of intermediate representations generated by 250A and 250B. As described further below, the only difference between intermediate representations generated by the two compilation sessions 220A and 220B (before entering the heuristic rule-based logical plan rewriting phase 250A/250B) are session-specific contextual information embedded in those intermediate representations, which does not affect subsequent compilation steps.

Thus, efficiency of optimizing parameterized queries can be improved by taking a shortcut for the second compilation session 220B by intelligently reusing an intermediate representation generated in the first compilation session 220A. For example, the second compilation session 220B can reuse the intermediate representation generated as an output of the query parsing phase 230A in the first compilation session 220A, thereby skipping or bypassing the algebraic rule-based logical plan rewriting phase 240B. As another example, the second compilation session 220B can reuse the intermediate representation generated as an output of the algebraic rule-based logical plan rewriting phase 240A in the first compilation session 220A, thereby skipping or bypassing both the query parsing phase 230B and algebraic rule-based logical plan rewriting phase 240B. Thus, with such a shortcut, the time consumption on the skipped operations can be saved or negated.

Figure 3:
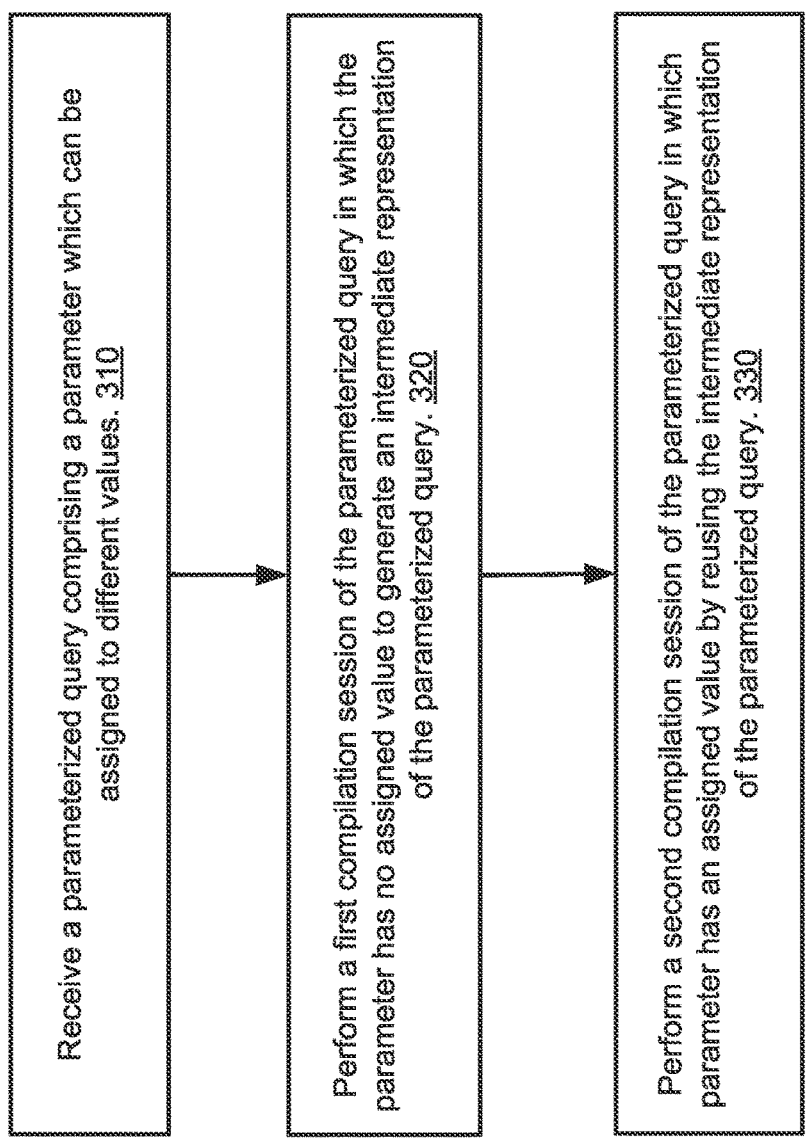
FIG. 3 is a flowchart illustrating an example overall method of implementing intelligent optimization of parameterized queries.

FIG. 3 is a flowchart illustrating an example overall method 300 of implementing intelligent optimization of parameterized queries, and can be performed, for example, by the intelligent query processing engine 130 of FIG. 1.

At 310, a parameterized query written in a declarative language is received. As described above, the parameterized query comprises at least one parameter which can be assigned different values.

At 320, the method 300 can perform a first compilation session (e.g., 220A) of the parameterized query in which the parameter has no assigned value. As described above, performing the first compilation session can generate an intermediate representation of the parameterized query, wherein the intermediate representation describes a relational algebra expression to implement the parameterized query. In some examples, the intermediate representation can be an AST generated after the query parsing phase (e.g., 230A). In some examples, the intermediate representation can be an output of the algebraic rule-based logical plan rewriting phase (e.g., 240A).

At 330, the method 300 can perform a second compilation session (e.g., a truncated version of 220B) of the parameterized query in which parameter has an assigned value. Specifically, performing the second compilation session can reuse the intermediate representation of the parameterized query generated in the first compilation phase. As described below, reusing the intermediate representation can be accomplished, for example, by using an ASP object. Thus, one or more compilation steps of the first compilation session that are used to generate the intermediate representation are skipped in the second compilation session. As discussed above, such skipped one or more compilation steps are parameter "blind" and operate independently of value assigned to the parameter. For example, if the reused intermediate representation is an AST generated after the query parsing phase 230A, then compilation steps in the algebraic rule-based logical plan rewriting phase 240B can be skipped in the second compilation session. As another example, if the reused intermediate representation is an output of the algebraic rule-based logical plan rewriting phase 240A, then compilation steps in both the query parsing phase 230B and algebraic rule-based logical plan rewriting phase 240B can be skipped in the second compilation session.

The method 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Figure 4:
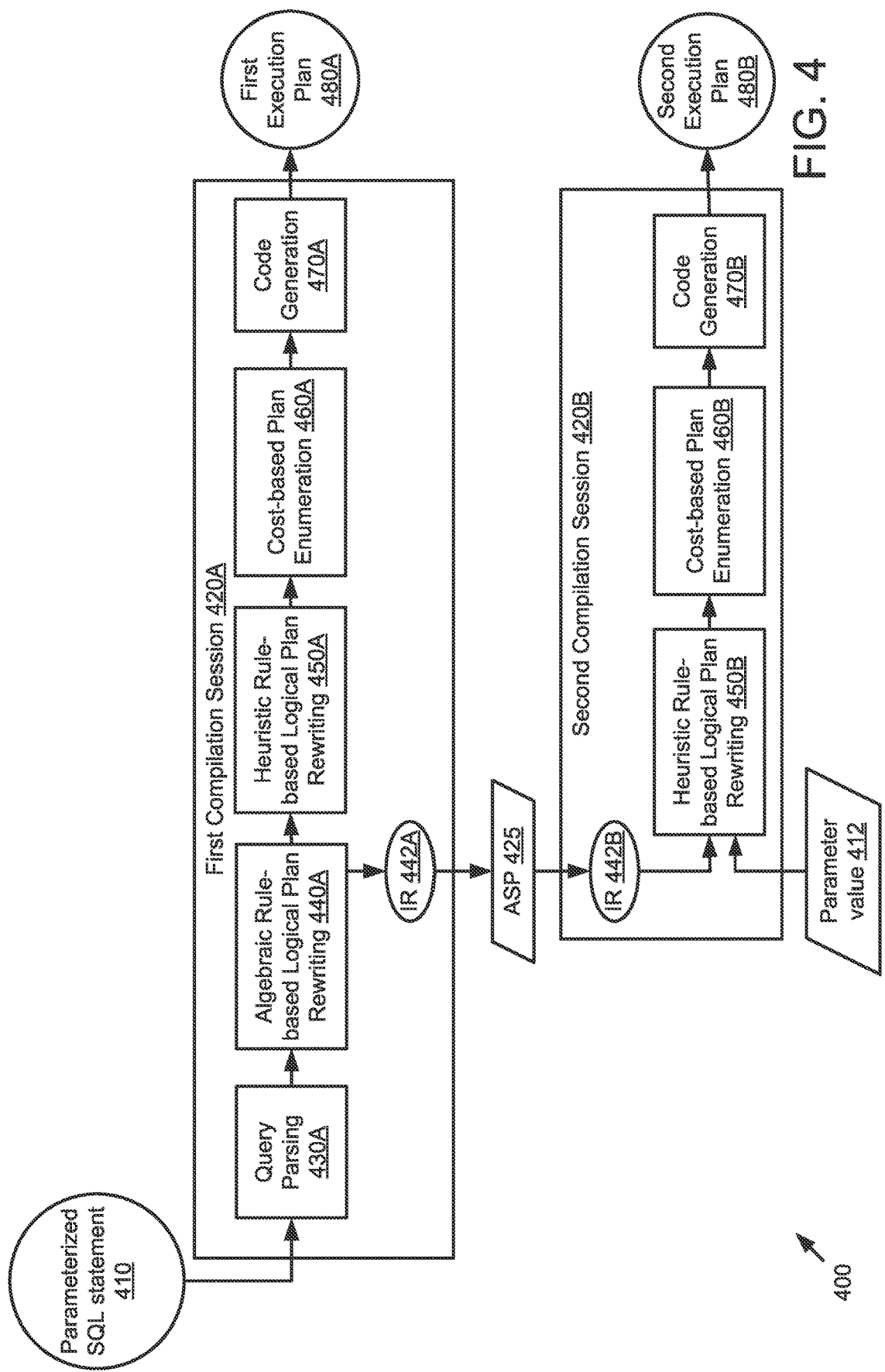
FIG. 4 is a flow diagram describing different phases of parameterized query optimization using two compilations sessions, according to another approach.

Example 6—Example Process of Optimizing Parameters Queries Using Abstract SQL Plans FIG. 4 depicts a flow diagram describing an example process 400 for optimizing a parameterized query using two separate compilation sessions linked by an ASP object, and can be implemented, for example, by the intelligent query processing engine 130 depicted in FIG. 1.

As shown, after receiving a parameterized query 410 comprising at least one parameter which has no assigned value, a first compilation session 420A can be triggered, which includes a query parsing phase 430A (similar to 230A), an algebraic rule-based logical plan rewriting phase 440A (similar to 240A), a heuristic rule-based logical plan rewriting phase 450A (similar to 250A), a cost-based plan enumeration phase 460A (similar to 260A), and a code generation phase 470A (similar to 270A). The output of the code generation phase 470A is a first execution plan 480A which represents the initial SQL execution plan, which is deemed to be an "optimal" plan in the absence of knowledge of parameter value for the parameterized query 410.

Then, after a user provides a parameter value 412 for the parameter, a second compilation session 420B can be triggered. An intermediate representation 442A (denoted as "IR") generated in the first compilation session 420A, e.g., the IR generated as an output of the algebraic rule-based logical plan rewriting phase 440A, can be reused in the second compilation session 420B. Specifically, the intermediate representation 442A can be serialized into an ASP object 425, which can be stored in an ASP store (e.g., 194 of FIG. 1). In some examples, data compression can be used to reduce the size of the ASP object 425, thus reducing the memory space needed to store the ASP object 425. The ASP object 425 can be provided as an input to the second compilation session 420B. Specifically, the ASP object 425 can be deserialized into an intermediate representation 442B which is used in the second compilation session 420B. The deserialized intermediate representation 442B has an identical query tree structure (i.e., identical nodes and edges) as 442A. As described herein, serialization is a process of converting the state of an object (e.g., the intermediate representation) into a stream of data (e.g., ASP object) that can be transported between two different compilation sessions, and deserialization is a process of converting the serialized stream of data into the original object state so that the original state is not altered or recreated when reusing the object.

As shown, the second compilation session 420B includes a heuristic rule-based logical plan rewriting phase 450B (similar to 250B), a cost-based plan enumeration phase 460B (similar to 260B), and a code generation phase 470B (similar to 270B). The output of the code generation phase 470B is a second execution plan 480B which is generally more "optimal" than the first execution plan 480A. Thus, the second execution plan 480B can replace the initial SQL execution plan 480A for query execution.

Notably, the second compilation session 420B in the depicted example has no corresponding query parsing phase or algebraic rule-based logical plan rewriting phase. Instead, the second compilation session 420B directly uses the intermediate representation 442B which has an identical query tree structure as the intermediate representation 442A generated in the first compilation session 420A. Such reusing of intermediate representation is feasible because the compilation steps in the query parsing phase and algebraic rule-based logical plan rewriting phase are deterministic, as described above. As a result, the compilation time for the second compilation session 420B can be substantially reduced as compared to the second compilation session 220B depicted in FIG. 2.

Example 7—Example Intermediate Representation

Figure 5:
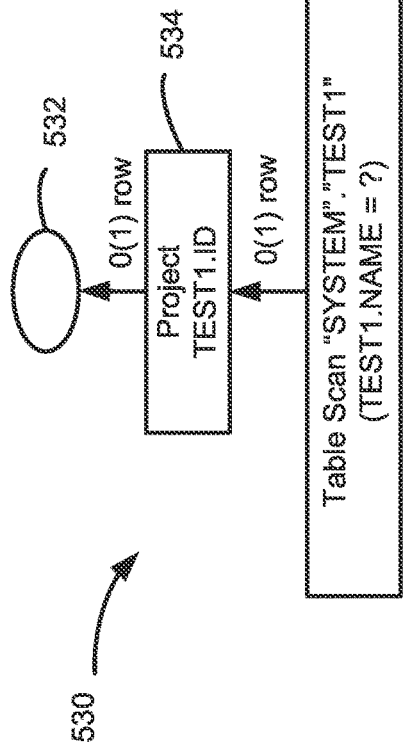
FIG. 5 depicts an example parameterized query and an example intermediate representation of a parameterized query.

FIG. 5 depicts an example parameterized query 510 written in a SQL statement: "SELECT ID FROM TEST1 WHERE NAME=?". In this example, the query 510 includes a parameter NAME whose value is not assigned.

An example intermediate representation 520 can be generated by performing a first (parameter-blind) compilation session of the parameterized query 510, e.g., after performing operations in a query parsing phase (e.g., 430A) and an algebraic rule-based logical plan rewriting phase (e.g. 440A). The intermediate representation 520 describes a relational algebra expression to implement the parameterized query 510. Specifically, the intermediate representation 520 describes a logical query tree structure 530 which includes a plurality of nodes (e.g., a root node 532, an internal node 534, and a leaf node 536) connected by edges (represented by arrows linking the nodes). Although the intermediate representation 520 is shown as a text format, it is to be understood that the intermediate representation 520 can be expressed as a binary stream during the optimization process in the running environment.

In the depicted example, the tuple includes within a pair of parenthesis (e.g., (0, 1)) indicates a (relation_id, column_id) pair, which specifies one column from one relation. For example, the leaf node 536 the query tree structure 530 corresponds to the following operations: "TABLE (0) TEST1, FILTER: (0, 1)=?1".

Here, the notation "TABLE (0) TEST 1" specifies that table TEST1 is a relation and its relation_id is 0. The notation "FILTER: (0, 1)=?1" specifies that the TABLE has a filter, where the tuple (0, 1) indicates that the relation 0's column index is 1 (i.e., the second column in the TABLE if the column index starts from 0, and "?1" specifies the first SQL parameter (i.e., NAME) appearing in the query. Likewise, the internal node 534 corresponds to a project operator "PROJECT (0,0)," which emits relation 0's column associated with index 0 (i.e., the first column of TEST1).

Example 8—Example ASP Object

In the example depicted in FIG. 5, the intermediate representation 520 includes contextual information that is specific to the compilation session from which the intermediate representation 520 is generated. Such contextual information includes physical information that is valid only for the specific compilation session, such as memory addresses of individual operator instances, etc. For example, the depicted intermediate representation 520 includes three physical addresses for operators represented by the nodes 532, 534, and 536, respectively.

If the second compilation session had not skipped the query parsing phase and the algebraic rule-based logical plan rewriting phase, the resulting intermediate representation generated in the second compilation session would have described the identical logical query tree structure 530, but with different contextual information that is specific to the second compilation session. Thus, in order to reuse the intermediate representation 520 for the second compilation session, contextual information specific to the first compilation session needs to be replaced with context information specific to the second compilation session. This can be accomplished, for example, by using an ASP object (e.g., 425) as a media bridging the two compilation sessions.

Specifically, the intermediate representation 520 can be serialized into an ASP object, which is written in a data exchange format (e.g., JSON, etc.) that is transportable between different compilation sessions. FIG. 6 depicts an example ASP object 600 that is serialized from the intermediate representation 520. As shown, the ASP object 600, which is written in JSON format, includes a plurality of attribute and value pairs, which can be organized in a nested structure.

According to one embodiment, the serialization process can take a bottom-up approach to construct the ASP object 600. For example, the serialization process can start looking into leaf operators of an intermediate representation (e.g., 520) and translate each operator into a JSON string one by one. For the operators visited/translated, each operator can be assigned with a unique identifier. These unique identifiers can be used for connecting the operators with their parent nodes. This is in contrast to the intermediate representations, where the operators are connected by physical pointers (e.g., physical addresses of operators). Thus, the ASP object 600 provides a generic description of the logical query tree structure 530, while omitting the contextual information of a specific compilation session.

When performing the second compilation session (e.g., 420B), the ASP object 600 can be deserialized into an intermediate representation 540, in which the contextual information of the second compilation session (e.g., physical addresses of operators) can be filled. The deserialized intermediate representation 540 has an identical query tree structure 530 as the original intermediate representation 520, thus describing the same relational algebra expression to implement the parameterized query 510. Such deserialized intermediate representation 540 can be used as a starting point for subsequent operations of the second compilation phase (e.g., the phases 450B, 460B, 470B, etc.).

Example 9—Example Advantages

A number of advantages can be achieved via the technologies described herein. As described above, optimizing parameterized queries can be challenging because cost estimation without knowing the value assigned to a query parameter can be inaccurate. Although using two sequential compilation sessions (e.g., one parameter-blind session followed by one parameter-aware session) can result in an improved query execution plan (e.g., with higher execution efficiency), such approach can lead to a prolonged optimization process and higher consumption of computing resources.

The technologies described herein, by intelligently reusing an intermediate representation of the parameterized query (e.g., via an intermediary ASP), can achieve the same improved query execution plan while substantially reducing the total compilation time. For example, three pilot tests were conducted to compare the total compilation times of using the optimization process depicted in FIG. 2 and the improved process described in FIGS. 3-4. Testing results show that, simply by skipping the algebraic rule-based logical plan rewriting phase, the total compilation time can decrease significantly (e.g., decrease from 46 ms to 25 ms in a first test scenario, decrease from 13191 ms to 17 ms in a second test scenario, and decrease from 653 ms to 60 ms in a third scenario).

Example 10—Example Computing Systems

Figure 7:
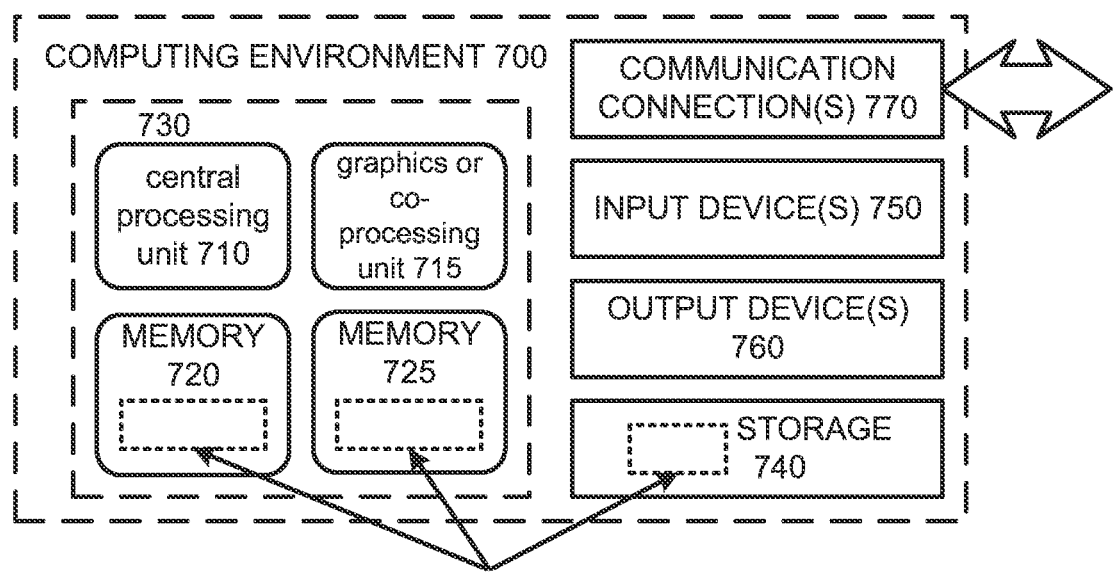
FIG. 7 is a block diagram of an example computing system in which described embodiments can be implemented.

FIG. 7 depicts an example of a suitable computing system 700 in which the described innovations can be implemented. The computing system 700 is not intended to suggest any limitation as to scope of use or functionality of the present disclosure, as the innovations can be implemented in diverse computing systems.

With reference to FIG. 7, the computing system 700 includes one or more processing units 710, 715 and memory 720, 725. In FIG. 7, this basic configuration 730 is included within a dashed line. The processing units 710, 715 can execute computer-executable instructions, such as for implementing the features described in the examples herein (e.g., the method 300). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 7 shows a central processing unit 710 as well as a graphics processing unit or co-processing unit 715. The tangible memory 720, 725 can be volatile memory (e.g., registers, cache, RAM), non-volatile memory (e.g., ROM, EEPROM, flash memory, etc.), or some combination of the two, accessible by the processing unit(s) 710, 715. The memory 720, 725 can store software 780 implementing one or more innovations described herein, in the form of computer-executable instructions suitable for execution by the processing unit(s) 710, 715.

A computing system 700 can have additional features. For example, the computing system 700 can include storage 740, one or more input devices 750, one or more output devices 760, and one or more communication connections 770, including input devices, output devices, and communication connections for interacting with a user. An interconnection mechanism (not shown) such as a bus, controller, or network can interconnect the components of the computing system 700. Typically, operating system software (not shown) can provide an operating environment for other software executing in the computing system 700, and coordinate activities of the components of the computing system 700.

The tangible storage 740 can be removable or non-removable, and includes magnetic disks, magnetic tapes or cassettes, CD-ROMs, DVDs, or any other medium which can be used to store information in a non-transitory way and which can be accessed within the computing system 700. The storage 740 can store instructions for the software implementing one or more innovations described herein.

The input device(s) 750 can be an input device such as a keyboard, mouse, pen, or trackball, a voice input device, a scanning device, touch device (e.g., touchpad, display, or the like) or another device that provides input to the computing system 700. The output device(s) 760 can be a display, printer, speaker, CD-writer, or another device that provides output from the computing system 700.

The communication connection(s) 770 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 11— Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 12—Example Cloud Computing Environment

Figure 8:
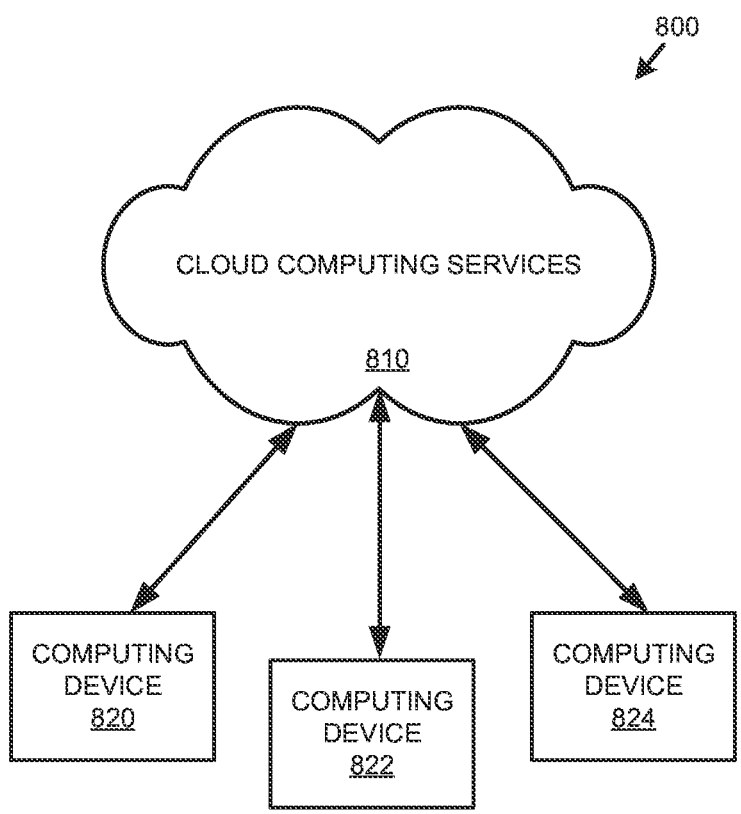
FIG. 8 is a block diagram of an example cloud computing environment that can be used in conjunction with the technologies described herein.

FIG. 8 depicts an example cloud computing environment 800 in which the described technologies can be implemented, including, e.g., the system 100 and other systems herein. The cloud computing environment 800 can include cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 can be utilized by various types of computing devices (e.g., client computing devices), such as computing devices 820, 822, and 823. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

In practice, cloud-based, on-premises-based, or hybrid scenarios can be supported.

Example 13—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 14—Example Embodiments

Any of the following example embodiments can be implemented.

Example 1. A computer-implemented method comprising: receiving a parameterized query written in a declarative language, wherein the parameterized query comprises a parameter which can be assigned different values; performing a first compilation session of the parameterized query in which the parameter has no assigned value, wherein performing the first compilation session generates an intermediate representation of the parameterized query, wherein the intermediate representation describes a relational algebra expression to implement the parameterized query; and performing a second compilation session of the parameterized query in which parameter has an assigned value, wherein performing the second compilation session reuses the intermediate representation of the parameterized query.

Example 2. The method of example 1, wherein the intermediate representation represents the parameterized query as a query tree object comprising a plurality of nodes connected by edges, wherein the nodes represent database operations.

Example 3. The method of any one of examples 1-2, further comprising: serializing the intermediate representation generated by the first compilation session into an abstract query plan; providing the abstract query plan as an input to the second compilation session; and deserializing the abstract query plan into the intermediate representation when performing the second compilation session.

Example 4. The method of example 3, wherein the abstract query plan is written in a data exchange format that is transportable between different compilation sessions.

Example 5. The method of any one of examples 1-4, wherein one or more compilation steps of the first compilation session that are used to generate the intermediate representation are skipped in the second compilation session.

Example 6. The method of example 5, wherein the skipped one or more compilation steps operate independently of value assigned to the parameter.

Example 7. The method of any one of examples 5-6, wherein the skipped one or more compilation steps comprise steps for parsing the parameterized query to generate an abstract syntax tree.

Example 8. The method of example 7, wherein the skipped one or more compilation steps comprise steps for normalizing the abstract syntax tree.

Example 9. The method of any one of examples 7-8, wherein the skipped one or more compilation steps comprise steps for converting the abstract syntax tree to the intermediate representation.

Example 10. The method of example 9, wherein converting the abstract syntax tree to the intermediate representation comprises sequentially applying one or more algebraic transformation rules to the abstract syntax tree.

Example 11. A computing system, comprising: memory; one or more hardware processors coupled to the memory; and one or more computer readable storage media storing instructions that, when loaded into the memory, cause the one or more hardware processors to perform operations comprising: receiving a parameterized query written in a declarative language, wherein the parameterized query comprises a parameter which can be assigned different values; performing a first compilation session of the parameterized query in which the parameter has no assigned value, wherein performing the first compilation session generates an intermediate representation of the parameterized query, wherein the intermediate representation describes a relational algebra expression to implement the parameterized query; and performing a second compilation session of the parameterized query in which parameter has an assigned value, wherein performing the second compilation session reuses the intermediate representation of the parameterized query.

Example 12. The method of example 11, wherein the intermediate representation represents the parameterized query as a query tree object comprising a plurality of nodes connected by edges, wherein the nodes represent database operations.

Example 13. The system of any one of examples 11-12, wherein the operations further comprise: serializing the intermediate representation generated by the first compilation session into an abstract query plan; providing the abstract query plan as an input to the second compilation session; and deserializing the abstract query plan into the intermediate representation when performing the second compilation session.

Example 14. The system of any one of examples 11-13, wherein one or more compilation steps of the first compilation session that are used to generate the intermediate representation are skipped in the second compilation session.

Example 15. The system of example 14, wherein the skipped one or more compilation steps operate independently of value assigned to the parameter.

Example 16. The system of any one of examples 14-15, wherein the skipped one or more compilation steps comprise steps for parsing the parameterized query to generate an abstract syntax tree Example 17. The system of example 16, wherein the skipped one or more compilation steps comprise steps for normalizing the abstract syntax tree.

Example 18. The system of any one of examples 16-17, wherein the skipped one or more compilation steps comprise steps for converting the abstract syntax tree to the intermediate representation.

Example 19. The system of example 18, wherein converting the abstract syntax tree to the intermediate representation comprises sequentially applying one or more algebraic transformation rules to the abstract syntax tree.

Example 20. One or more non-transitory computer-readable media having encoded thereon computer-executable instructions causing one or more processors to perform a method comprising: receiving a parameterized query written in a declarative language, wherein the parameterized query comprises a parameter which can be assigned different values; performing a first compilation session of the parameterized query in which the parameter has no assigned value, wherein performing the first compilation session generates an intermediate representation of the parameterized query, wherein the intermediate representation describes a relational algebra expression to implement the parameterized query; serializing the intermediate representation generated by the first compilation session into an abstract query plan; performing a second compilation session of the parameterized query in which parameter has an assigned value; and deleting the abstract query plan after completing the second compilation session, wherein the abstract query plan is provided as an input to the second compilation session, wherein performing the second compilation session comprises deserializing the abstract query plan into the intermediate representation, and reusing the intermediate representation of the parameterized query.

Example 15—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method for improving efficiency of parameterized query optimization, the method comprising:
receiving a parameterized query written in a declarative language, wherein the parameterized query comprises a placeholder which can be assigned different values when the parameterized query is executed;
generating a first query plan, wherein generating the first query plan comprises performing a first compilation session of the parameterized query in which the placeholder has no assigned value, wherein performing the first compilation session comprises:
generating an intermediate representation of the parameterized query, wherein the intermediate representation describes a relational algebra expression to implement the parameterized query; and
generating the first query plan based on the intermediate representation;
serializing the intermediate representation into an abstract query plan; and
generating a second query plan different from the first query plan, wherein generating the second query plan comprises performing a second compilation session of the parameterized query in which the placeholder has an assigned value, wherein performing the second compilation session comprises:
providing the abstract query plan and the assigned value as input to the second compilation session;
deserializing the abstract query plan into the intermediate representation; and
reusing the intermediate representation to generate the second query plan; and
executing the parameterized query using the second query plan.

2. The method of claim 1, wherein the intermediate representation represents the parameterized query as a query tree object comprising a plurality of nodes connected by edges, wherein the nodes represent database operations.

3. The method of claim 1, wherein the abstract query plan is written in a data exchange format that is transportable between different compilation sessions.

4. The method of claim 1, wherein one or more compilation steps of the first compilation session that are used to generate the intermediate representation are skipped in the second compilation session.

5. The method of claim 4, wherein the skipped one or more compilation steps operate independently of value assigned to the placeholder.

6. The method of claim 4, wherein the skipped one or more compilation steps comprise steps for parsing the parameterized query to generate an abstract syntax tree.

7. The method of claim 6, wherein the skipped one or more compilation steps comprise steps for normalizing the abstract syntax tree.

8. The method of claim 6, wherein the skipped one or more compilation steps comprise steps for converting the abstract syntax tree to the intermediate representation.

9. The method of claim 8, wherein converting the abstract syntax tree to the intermediate representation comprises sequentially applying one or more algebraic transformation rules to the abstract syntax tree.

10. A computing system for improving efficiency of parameterized query optimization, the system comprising:
memory;
one or more hardware processors coupled to the memory; and
one or more computer readable storage media storing instructions that, when loaded into the memory, cause the one or more hardware processors to perform operations comprising:
receiving a parameterized query written in a declarative language, wherein the parameterized query comprises a placeholder which can be assigned different values when the parameterized query is executed;
generating a first query plan, wherein generating the first query plan comprises performing a first compilation session of the parameterized query in which the placeholder has no assigned value, wherein performing the first compilation session comprises:
generating an intermediate representation of the parameterized query, wherein the intermediate representation describes a relational algebra expression to implement the parameterized query; and
generating the first query plan based on the intermediate representation;
serializing the intermediate representation into an abstract query plan; and
generating a second query plan different from the first query plan, wherein generating the second query plan comprises performing a second compilation session of the parameterized query in which the placeholder has an assigned value, wherein performing the second compilation session comprises:
providing the abstract query plan and the assigned value as input to the second compilation session;
deserializing the abstract query plan into the intermediate representation; and
reusing the intermediate representation to generate the second query plan; and
executing the parameterized query using the second query plan.

11. The system of claim 10, wherein the intermediate representation represents the parameterized query as a query tree object comprising a plurality of nodes connected by edges, wherein the nodes represent database operations.

12. The system of claim 10, wherein one or more compilation steps of the first compilation session that are used to generate the intermediate representation are skipped in the second compilation session.

13. The system of claim 12, wherein the skipped one or more compilation steps operate independently of value assigned to the placeholder.

14. The system of claim 12, wherein the skipped one or more compilation steps comprise steps for parsing the parameterized query to generate an abstract syntax tree.

15. The system of claim 14, wherein the skipped one or more compilation steps comprise steps for normalizing the abstract syntax tree.

16. The system of claim 14, wherein the skipped one or more compilation steps comprise steps for converting the abstract syntax tree to the intermediate representation.

17. The system of claim 16, wherein converting the abstract syntax tree to the intermediate representation comprises sequentially applying one or more algebraic transformation rules to the abstract syntax tree.

18. One or more non-transitory computer-readable media having encoded thereon computer-executable instructions causing one or more processors to perform a method for improving efficiency of parameterized query optimization, the method comprising:

receiving a parameterized query written in a declarative language, wherein the parameterized query comprises a placeholder which can be assigned different values when the parameterized query is executed;

generating a first query plan, wherein generating the first query plan comprises performing a first compilation session of the parameterized query in which the placeholder has no assigned value, wherein performing the first compilation session comprises:

generating an intermediate representation of the parameterized query, wherein the intermediate representation describes a relational algebra expression to implement the parameterized query; and generating the first query plan based on the intermediate representation;

serializing the intermediate representation into an abstract query plan;

generating a second query plan different from the first query plan, wherein generating the second query plan comprises performing a second compilation session of the parameterized query in which the placeholder has an assigned value;

wherein performing the second compilation session comprises:

providing the abstract query plan and the assigned value as input to the second compilation session;

deserializing the abstract query plan into the intermediate representation, and reusing the intermediate representation to generate the second query plan; and executing the parameterized query using the second query plan.

* * * * *